J. DANA.
Cotton-Seed Planter.
No. 163,748. Patented May 25, 1875.
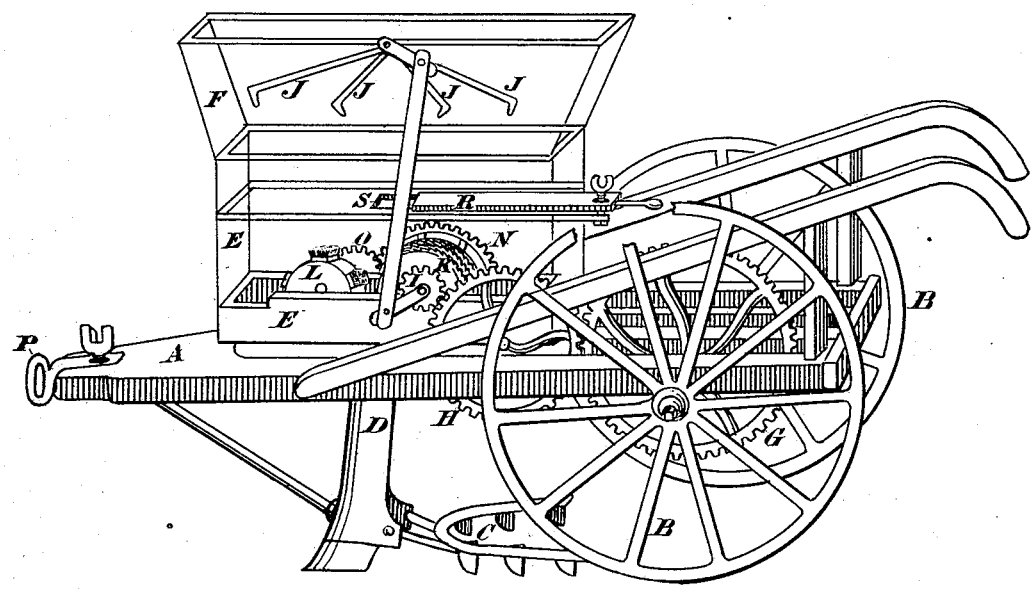
WITNESSES.
Frank Pardon.
Charles Swetner
INVENTOR.
Joseph Dana.
by J. G. Hewitt
attorney

UNITED STATES PATENT OFFICE.

JOSEPH DANA, OF MITCHELL, INDIANA, ASSIGNOR OF ONE-HALF HIS RIGHT TO EDWARD P. HAMILTON, OF LOUISVILLE, KENTUCKY.

IMPROVEMENT IN COTTON-SEED PLANTERS.

Specification forming part of Letters Patent No. 163,748, dated May 25, 1875; application filed April 6, 1875.

*To all whom it may concern:*

Be it known that I, JOSEPH DANA, of Mitchell, in the county of Lawrence and State of Indiana, have invented a certain new and useful Improvement in Cotton-Seed Planters; and I do hereby declare that the following is a full, clear, and exact description thereof, which will enable others skilled in the art to make and use the same, reference being had to the accompanying drawings, forming part of this specification.

The drawing is a perspective view of the machine, with one side of the hopper-box left out in order to show the interior arrangement of the several devices therein.

This invention consists in a machine for planting cotton-seed, composed of a framework having a drill-tooth, a rake or follower, and a two-part hopper, the last constructed with a revolving cylinder armed with saws for feeding the seed; a revolving brush operating in conjunction with such saw-cylinder; an adjustable plate for controlling the quantity of seed fed to the cylinder, and a stirrer or agitator hung on an independent shaft in the upper part of the hopper, and receiving an oscillating motion by crank-connections with the driving mechanism, these several parts co-operating to regularly feed the seed to the spout or drill-tooth, and to prevent the seed being thrown out of the hopper, as hereinafter specified.

This machine will be found more fully illustrated in detail in the drawing, in which A is the frame, all of which is made of wood and in form as shown in the drawing. B B are the main wheels of the machine. C is the rake or follower for covering the seed, and D is the discharge-spout and device for opening the row, all of which are made of metal and in form as shown in the drawings. E is the lower, and F F the upper, parts of the hopper-box. R is a slide in the rear end of the box, over the serrated blades, for regulating the feed accurately, which slide is pressed in or withdrawn, as the nature of the case may require, to adjust the feed. S is the seed-opening under this last-named slide. G is the main driving-wheel of the machine, and H is the intermediate wheel, by means of which motion is transmitted to the pinion I, to operate the saw-cylinder K and agitators J J J J. L is a brush-wheel to prevent the seed from adhering to the teeth of the saws, which wheel is made of wood and bristles, and in form as shown in the drawing. K is the series of saws or serrated blades, all of which are made of steel, and secured to the shaft between blocks of wood or otherwise. N is the main wheels by means of which motion is transmitted to operate the pinion O, which operates the brush-wheel L. P is the clevis by which the machine is drawn.

Having thus fully described the nature and object of this my invention, what I claim as new, and desire to secure by Letters Patent, is—

In a cotton-seed planter, the combination of the agitators J, regulator R, brush-cylinder L, and saw-cylinder K, constructed and arranged substantially as shown and described.

JOSEPH DANA.

Witnesses:
FRANK PARDON,
CHARLES SWETNER.